Sept. 8, 1970    M. I. PLACE    3,526,952
APPARATUS AND METHOD FOR ASSEMBLING A WALL PANEL
Filed May 15, 1968    3 Sheets-Sheet 1

INVENTOR.
MARK I. PLACE
BY
William J. Ruano
his ATTORNEY

Sept. 8, 1970   M. I. PLACE   3,526,952
APPARATUS AND METHOD FOR ASSEMBLING A WALL PANEL
Filed May 15, 1968   3 Sheets-Sheet 2

INVENTOR.
MARK I. PLACE
BY
*William J. Ruano*
his ATTORNEY

Sept. 8, 1970 M. I. PLACE 3,526,952
APPARATUS AND METHOD FOR ASSEMBLING A WALL PANEL
Filed May 15, 1968 3 Sheets-Sheet 3
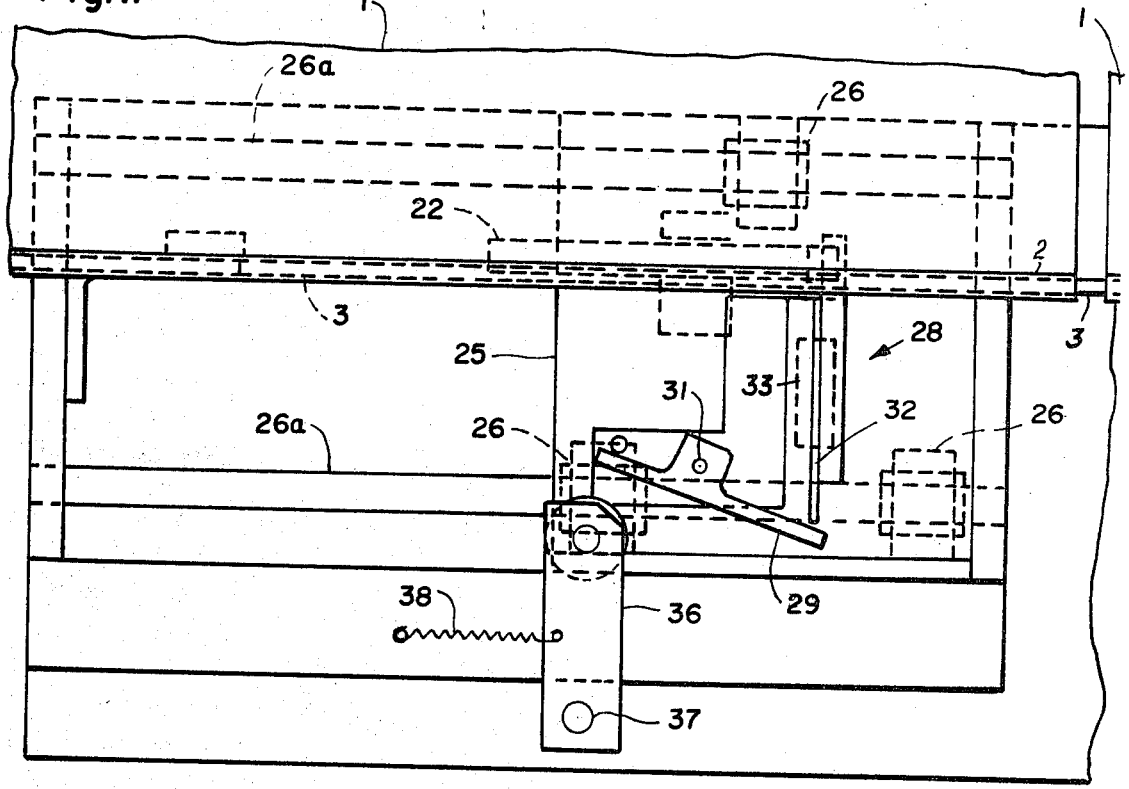
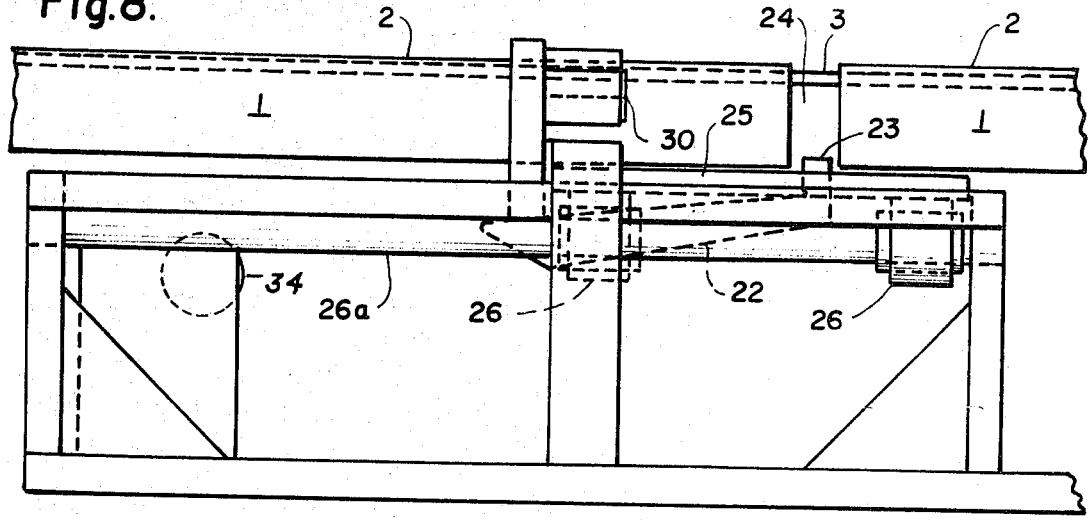
INVENTOR.
MARK I. PLACE
BY
*William J. Ruano*
his ATTORNEY United States Patent Office 3,526,952
Patented Sept. 8, 1970

3,526,952
APPARATUS AND METHOD FOR ASSEMBLING A WALL PANEL
Mark I. Place, Bethel Park, Pa., assignor to Elwin G. Smith & Co., Inc., Pittsburgh, Pa.
Filed May 15, 1968, Ser. No. 729,258
Int. Cl. B23p *19/04;* B23k *37/06;* B23g *41/08*
U.S. Cl. 29—450                                            5 Claims

ABSTRACT OF THE DISCLOSURE

Apparatus and method for installing a tubular gasket in the female portion of a rib of a wall or roof panel or similar element.

The method comprises spraying glue into the female portion and blowing the tubular gasket into such portion by an air jet so as to prevent twisting of the tube along its longitudinal axis as might otherwise occur by mechanical forcing means.

After the tube is sealed in place in the rib, it is cut in the gap between panels by a flying shear of unique construction so that cutting takes place after the gap reaches a predetermined position and by camming means which operate a shearing knife mounted on a cutting platform which is retracted by spring action to its initial position without retracting the panel so that the latter may continue to move on a production line.

---

The present invention relates to a method and apparatus for inserting a tubular gasket in sealing engagement in the female portion of a rib of a wall or roof panel of the construction shown in a pending application of Ralph D. Widdowson, Ser. No. 695,254 filed Jan. 2, 1968, now Pat. No. 3,394,515, issued July 30, 1968, assigned to the present assignee. The invention also relates to a unique flying shear construction for subsequently cutting the end of the tubular gasket projecting out of such panel.

In the past, difficulties have been encountered in the insertion of the tubular gasket into the female portion of the rib of a wall or roof panel, since when attempts were made to mechanically force the tubular gasket into seating engagement with the female portion, the tubular gasket would twist about its longitudinal axis and thus fail to make continuous contact with the seat of the female portion and impairing the effectiveness and reliability of the seal.

An object of the present invention is to provide a novel method and apparatus for overcoming the above-mentioned difficulty and by which the tubular gasket may be seated in place in the rib without causing twisting about its longitudinal axis so as to assure continuity of its sealing contact with the female portion of the rib throughout the entire length thereof.

Another object of the present invention is to provide a novel flying shear construction which enables very rapid shearing of the tubular portion after it is inserted in the rib, which shearing occurs in the spaces or gaps between wall panels as they are moved along the production line.

Other objects and advantages will become more apparent from a study of the following description taken with the accompanying drawings wherein:

FIG. 7 is an enlargement of the cutter assembly shown at the left of FIG. 1; and FIG. 8 is an enlargement of the cutter assembly shown at the left of FIG. 2.

The assembly embodying the present invention is placed on the exit end of the roll former mill (not shown). This roll former mill is continuously forming coiled sheet into a finished wall panel product and shearing the product up into finished lengths. The gasket installation equipment functions to insert the tubular gasket 3 into the female rib 2 of wall panel 1 as it is carried past by the exit conveyors of the roll former mill. It also functions to cut the gasket (which is fed off continuous spools) corresponding to the sheet lengths. As such, the machine is divided into two functions, namely, the feeder shown at the right of FIGS. 1 and 2 and the chopper, shown at the left.

Figure 1:
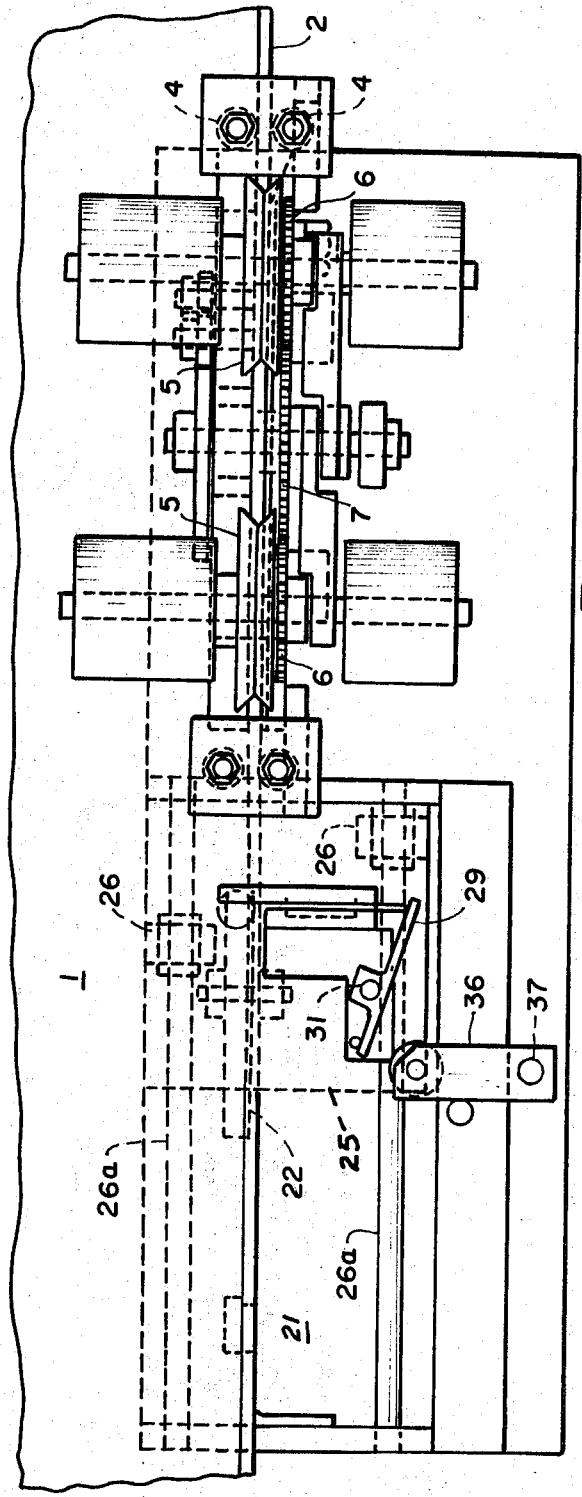
FIG. 1 is a top, plan view showing the feeder and cutter assembly embodying the present invention.
Figure 2:
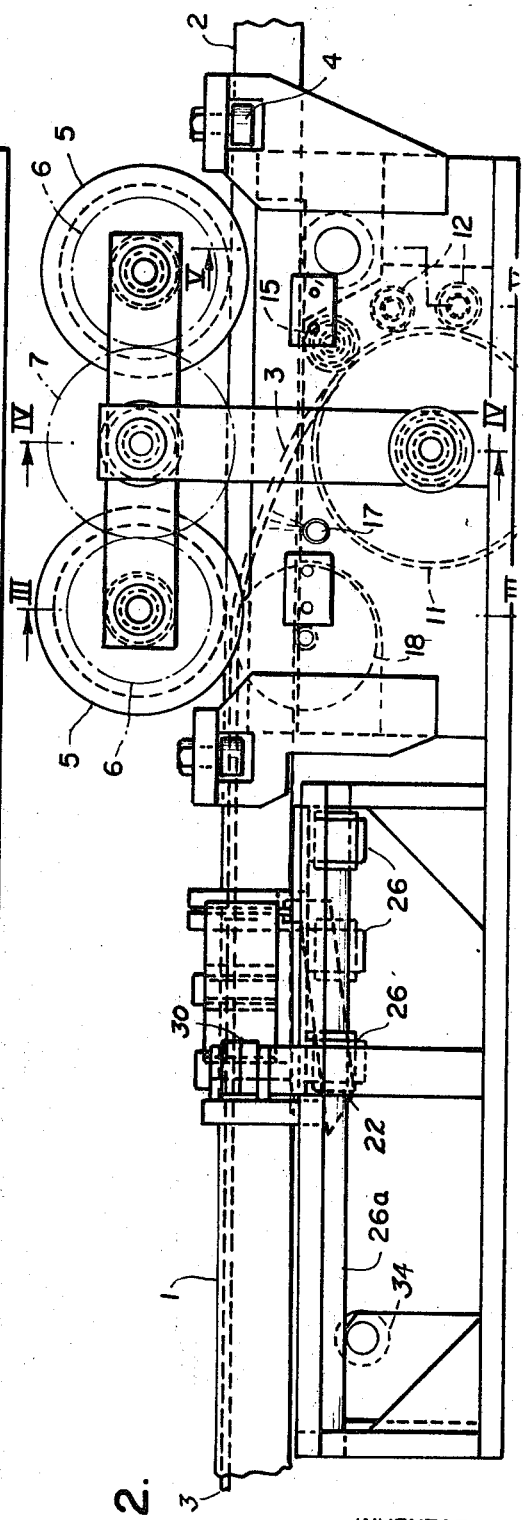
FIG. 2 is a front, elevational view of the assembly shown in FIG. 1.
Figure 3:
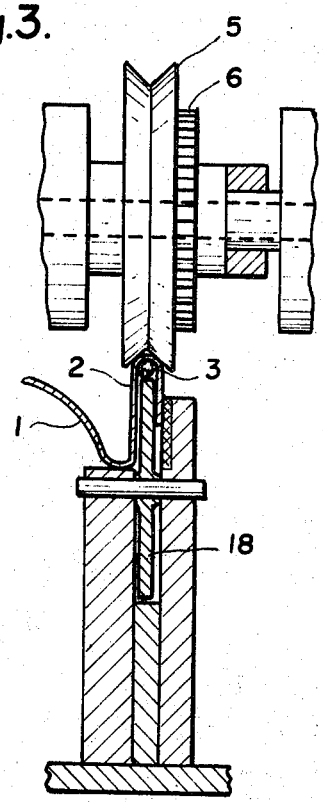
FIG. 3 is an enlarged, vertical, cross-sectional view taken along line III—III of FIG. 2.
Figure 4:
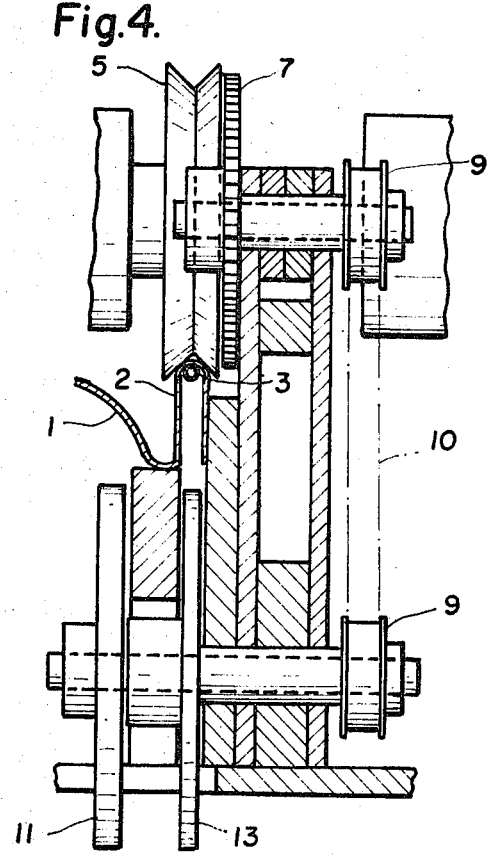
FIG. 4 is an enlarged, vertical, cross-sectional view taken along line IV—IV of FIG. 2.
Figure 6:
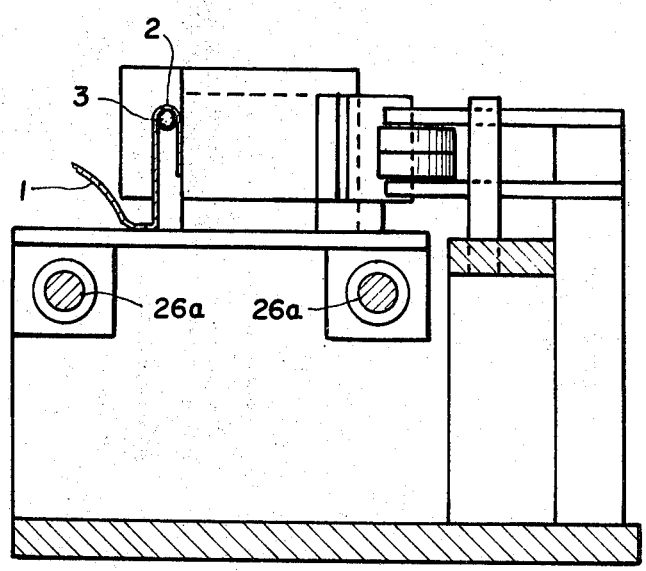
FIG. 6 is a transverse, cross-sectional view taken along line VI—VI of FIG. 2.
Figure 5:
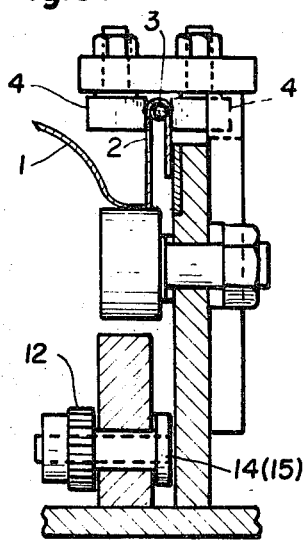
FIG. 5 is an enlarged, vertical, cross-sectional view taken along line V—V of FIG. 2.

Referring more particularly to FIGS. 1 and 2 of the drawings, the ribbed sheet or panel 1 enters the feeder section through guide rollers 4 which guide the rib 2 thereof. Drive rollers 5 are rotated by frictional contact with the sheet passing under them and drive through gears 6 to gear 7 through pulleys 9 and belt 10 (see FIG. 4), to gear 11, which drives gears 12 (FIG. 5). Pinch roll 13 is driven off the same shaft as gear 11 and pinch rolls 14 and 15 are driven by gears 12. The gasket is fed up between pinch rolls 14 and 15. Rolls 13 act as feed pinch rolls to push the gasket 3 up into feeding position.

The gear and pulley ratios are proportioned so that the proper amount of tubular gasket 3 is fed corresponding to the amount of sheet passing through the machine. By using this drive roll principle of gasket feeding as opposed to a separate motor drive, there is assured proper synchronizing of the rate the gasket is fed to the amount of sheet passing through the machine, regardless of any variations. This drive eliminates the necessity of the use of expensive and complicated tachometer feed-back controls which would be required if an electrical motor drive were to be synchronized to the speed of the sheet.

As the gasket 3 is fed up into the rib 2 by the feed pinch rolls 14, 15 and 13, and air jet 17 impinges upon it and blows it up into a seated position. The air jet is directed at right angles to rib 2 or, better still, at less than a right angle so as to blow somewhat in the direction from which it is fed into the rib. After the air jet slightly collapses and seats the tubular gasket without twisting it, a seating roller 18 finishes the job of securely seating the gasket into the bottom of the female rib 2 of the sheet 1.

After the sheet has passed through the feeder section with gasket 3 installed in place, it passes through the chopper section 21 shown at the left of FIGS. 1 and 2 and, in more detail, in FIGS. 7 and 8. A gravity loaded finger 22 rides under the sheet held down until a gap 24 in the sheet occurs (FIG. 8), brought about by the roll former shearing the sheets to length. When this gap passes across the nose 23 of finger 22, nose 23 swings up into the gap 24 as shown in FIG. 8. The tubular gasket 3 which is being fed continuously by the feeder carries right across the gap. The moving sheet 1 at the right, by pushing against the gravity loaded finger 22, carries with it, platform 25 forward on its ball bushings 26. Striker or actuating lever 29 contacts rollers 30 and thus pivots about pivot 31, depressing shear knife 32, that is, moving it upwardly as viewed in FIG. 7 against the action of a spring 33. Knife 32 cuts the gasket 3 where it is exposed in the gap 24 between the sheets.

As platform 25, which carries the knife and its operating lever 29, continues to be carried forward, finger or lever 29 strikes lower roller wheel 34, and is cammed out of engagement with the sheet. Springs (not shown), return platform 25 to its original position. Carrier roller 36, which carries the upper rollers on platform 25 which causes the cutting action, is pivoted about pivot 37 and held in position by a light spring 38. As platform 25 is returned to its starting position, striker 29 tends to strike carrier rollers 30, which, being pivoted and spring-restrained, swings out of the way and allows striker 29 to pass.

Basically, the gasket 3 is large enought to be retained in the female portion of rib 2 by friction. However, in actual practice, it tends to get shaken out during handling and shipping. As a consequence, there is preferably incorporated in the production line, a glue gun (not shown) which injects a fine line of glue into the base of the female portion of the rib 2 prior to seating the gasket.

Although the machine has been described as being driven off at the sheet through the drive roller, in actual practice, sometimes, it suffers loss of reliability due to slippage of the drive rollers on the sheet when it is oily. To correct this, a small universal torque motor is added which does not have sufficient power to drive the feeder in itself but which does have sufficient driving torque to overcome the various gear and bearing frictions and make it much easier for the driving rolls to perform their task.

It should be noted that instead of locating the tube feeding means under the machine as shown in FIG. 2, the tube may be, instead, fed by any suitable external feeding means which will automatically provide a predetermined amount of slack in the tube as it is being fed into the machine.

It should be further noted that instead of feeding the tube 3 upwardly into the downwardly facing female portion of the rib 2, such portion may be inverted so as to face upwardly and the tube 3 fed downwardly so as to be aided by gravity.

Thus it will be seen that I have provided a highly efficient method for feeding a sealing gasket of tubular construction in the female portion of a rib of a wall or roof panel or similar element so as to prevent twisting of the tube as it is being inserted in the female portion which embodies the use of a jet of air which flows outside diametrically opposite sides of the tube which frictionally contact the female portion so as to slightly collapse the tube sufficiently to free itself of such frictional contact and become quickly seated therein while floating in air and thereby avoid any twist that might otherwise be imparted by mechanically forcing the tube in place; furthermore, I have provided a highly efficient flying shear of unique construction which enables automatic cutting of the projecting tubular gasket portion extending in the gap between successive wall panels so as to shear the tubes automatically at very high speed so as not to retard the speed of the production line.

I claim:

1. The method of inserting a tubular sealing gasket into the female portion of a rib of a structural element, wherein said portion is of substantially the same width as the outer diameter of the tubular gasket, comprising directing a jet of air, under pressure, against the tubular gasket at substantially right angles to its longitudinal axis so as to slightly collapse the diameter of the tubular gasket by passage of air outside diametrically opposite portions of the tubular gasket which frictionally contact the side walls of the female portion, so as to seat the tubular gasket in the female portion of the rib without twisting the tubular gasket along its longitudinal axis.

2. The method as recited in claim 1, wherein the bottom of the female portion is initially sprayed with glue so as to hold the tubular gasket in place after seating by said air jet.

3. The method as recited in claim 1, wherein said air jet is directed at an angle of greater than 90° in the direction from which the tubular gasket is fed into the female portion of the rib.

4. Apparatus for inserting a tubular gasket in the female portion of a rib of a structural sheet as it is moving along a production line, comprising means for inserting the tubular gasket into the female portion including means for directing a jet of air substantially at right angles to the tubular axis to slightly collapse the tubular gasket and force it into seating engagement in the female portion of the rib, and cutting means for cutting the tubular portion projecting outside of said rib.

5. Apparatus as recited in claim 4, wherein said cutting means comprises a platform, a flying shear supported thereon and cam operating means for operating said flying shear when said sheet moves to a predetermined position and spring operated means for retracting said platform without retracting said sheet upon completion of the shearing of the tube.

References Cited
UNITED STATES PATENTS

| | | | |
|---|---|---|---|
| 51,679 | 12/1865 | Andrews | 93—77 |
| 2,661,582 | 12/1953 | Hanser | 93—84 |
| 3,150,576 | 9/1964 | Gewiss | 93—84 |
| 3,394,515 | 7/1968 | Widdowson | 52—394 |

WAYNE A. MORSE, JR., Primary Examiner

U.S. Cl. X.R.

29—235, 472.9; 93—77, 84